US008528879B2

(12) United States Patent
Mueller et al.

(10) Patent No.: US 8,528,879 B2
(45) Date of Patent: Sep. 10, 2013

(54) METHOD AND DEVICE FOR PRODUCING A HIGH-PRESSURE-TIGHT CONNECTION AND ASSOCIATED VALVE CARTRIDGE FOR A SOLENOID VALVE

(75) Inventors: Friedrich Mueller, Immenstadt (DE); Guenther Schnalzger, Blaichach (DE); Martin Kirschner, Blaichach (DE)

(73) Assignee: Robert Bosch GmbH, Stuttgart (DE)

( * ) Notice: Subject to any disclaimer, the term of this patent is extended or adjusted under 35 U.S.C. 154(b) by 586 days.

(21) Appl. No.: 12/669,661

(22) PCT Filed: Jul. 3, 2008

(86) PCT No.: PCT/EP2008/058573
§ 371 (c)(1),
(2), (4) Date: Jan. 19, 2010

(87) PCT Pub. No.: WO2009/013102
PCT Pub. Date: Jan. 29, 2009

(65) Prior Publication Data
US 2010/0187453 A1    Jul. 29, 2010

(30) Foreign Application Priority Data
Jul. 20, 2007  (DE) .......................... 10 2007 034 032

(51) Int. Cl.
*F16K 31/02*  (2006.01)
(52) U.S. Cl.
USPC ............. 251/129.15; 251/129.18; 137/315.03
(58) Field of Classification Search
USPC ....... 251/129.03, 129.15, 129.18; 137/15.18, 137/315.03; 303/119.2; 335/278, 281, 297; 29/606
See application file for complete search history.

(56) References Cited

U.S. PATENT DOCUMENTS

| 4,056,255 | A | * | 11/1977 | Lace | .......................... 251/129.15 |
| 4,624,282 | A |   | 11/1986 | Fargo |   |
| 5,584,465 | A | * | 12/1996 | Ochsenreiter | ............ 251/129.05 |
| 5,810,330 | A | * | 9/1998 | Eith et al. | .................... 303/119.2 |

(Continued)

FOREIGN PATENT DOCUMENTS

| EP | 0143062 A1 | 5/1985 |
| EP | 1647460 A1 | 4/2006 |
| NL | 34169 C | 7/1934 |

*Primary Examiner* — Eric Keasel
(74) *Attorney, Agent, or Firm* — Maginot, Moore & Beck

(57) ABSTRACT

The invention relates to a method and a device for producing a high-pressure-tight connection between a pole core and a valve sleeve of a solenoid valve and to an associated valve cartridge for a solenoid valve. According to the invention, the pole core is placed in a two-part compression mold, which comprises a middle die and an outer die, in such a way that a joining gap is produced between an inner bore of the outer die and the placed-in pole core. Subsequently, the pole core is placed against the valve sleeve and the valve sleeve is inserted into the joining gap. Then, the middle die and the outer die are pressed simultaneously with the pole core such that the valve sleeve passes into the joining gap. When a pressed diameter of the pole core is reached, the valve sleeve expands and is shaped in the joining gap between a first shaping edge and a second shaping edge and is joined onto the pole core. The diameter of the inner bore tapers between the first shaping edge and the second shaping edge. Application of further force by the outer die allows the pole core to be pressed deeper into the valve sleeve, in order to carry out a desired stroke setting for the movement of an armature by performing the further shaping of the valve sleeve.

7 Claims, 5 Drawing Sheets

(56) References Cited

U.S. PATENT DOCUMENTS

| | | |
|---|---|---|
| 6,364,431 B1 * | 4/2002 | Yabuki et al. .............. 303/119.2 |
| 6,405,752 B1 * | 6/2002 | Fritsch et al. ............ 251/129.15 |
| 6,789,779 B2 * | 9/2004 | Wilde et al. .............. 251/129.15 |
| 7,246,863 B2 * | 7/2007 | Otsuka ....................... 303/119.2 |
| 7,717,399 B2 * | 5/2010 | Park .......................... 251/129.15 |
| 2004/0239178 A1 * | 12/2004 | Otsuka ....................... 303/119.3 |

* cited by examiner

METHOD AND DEVICE FOR PRODUCING A HIGH-PRESSURE-TIGHT CONNECTION AND ASSOCIATED VALVE CARTRIDGE FOR A SOLENOID VALVE

CROSS-REFERENCE TO RELATED APPLICATION

This application is a 35 USC 371 application of PCT/EP2008/058573 filed on Jul. 3, 2008.

BACKGROUND OF THE INVENTION

1. Field of the Invention

The invention relates to a method and a device for producing a high-pressure-tight connection between a pole core and valve sleeve of a magnet valve, and to an associated valve cartridge for a magnet valve.

2. Description of the Prior Art

A valve cartridge for a conventional magnet valve, in particular for a hydraulic unit that is used for instance in an anti-lock brake system (ABS) or traction control system (TC system) or electronic stability program system (ESP system), is shown in FIG. 1. As can be seen from FIG. 1, the valve cartridge for the conventional magnet valve includes a pole core 1, a valve sleeve 3, and an armature 2 that is movable inside the valve sleeve by a magnetic flux, introduced by a magnet unit, not shown, axially counter to the force of a restoring spring 5 in the direction of the pole core 1 via an air gap 6. In the production of the valve cartridge for the conventional magnet valve, the pole core 1 is first pre-press-fitted into the valve sleeve 3. Next, in a different assembly station, iterative adjustment of the armature stroke is performed by further press-fitting introduction of the pole core 1 into the valve sleeve 3, until the desired armature stroke is reached. Next, in a further assembly station, the pole core 1 is solidly connected to the valve sleeve 3 by a sealing weld seam 4, the sealing weld seam 4 being produced for instance by laser welding. By means of the sealing weld seam 4, the valve cartridge is sealed off hydraulically from the atmosphere. However, in terms of setup, maintenance, repair and monitoring, laser welds are vulnerable to mistakes and are cost-intensive.

ADVANTAGES AND SUMMARY OF THE INVENTION

The method according to the invention for producing a high-pressure-tight connection between a pole core and a valve sleeve of a magnet valve has the advantage over the prior art that the assembly flow for a valve cartridge can be made simpler and more economical by omitting laser welding. By inserting the pole core into a two-part press-fitting tool, which includes a middle die and an outer die, so that between an inner bore of the outer die and the inserted pole core a joining gap is created, and by placing the pole core against the valve sleeve and introducing the valve sleeve into the joining gap and simultaneously pressing down the middle die and the outer die with the pole core so that the valve sleeve passes through the joining gap, the pre-press-fitting and the sealing off from outside can be accomplished in one operation in one assembly station. When a press-fit diameter of the pole core is reached, the valve sleeve is widened and is reshaped in the joining gap between a first reshaping edge and a second reshaping edge, between which the diameter of the inner bore narrows, and is joined to the pole core, creating a high-pressure-tight connection between the pole core and the valve sleeve.

The device according to the invention for producing a high-pressure-tight connection between a pole core and a valve sleeve of a magnet valve has a two-part press-fitting tool, which includes a middle die and an outer die. The press-fitting tool is embodied such that between an inner bore of the outer die and the pole core inserted into the press-fitting tool, a joining gap is embodied which is traversed in the course of assembly by the valve sleeve. The inner bore of the outer die has a first reshaping edge and a second reshaping edge, between which the diameter of the inner bore narrows. The press-fitting tool presses the pole core into the valve sleeve by simultaneous pressing down of the middle die and the outer die, in order to reshape the valve sleeve in the joining gap between the first reshaping edge and the second reshaping edge and to join it to the pole core, creating a high-pressure-tight connection between the pole core and the valve sleeve.

The valve cartridge according to the invention has a high-pressure-tight connection between a pole core and a valve sleeve of a magnet valve; this connection is produced by press-fitting the pole core into the valve sleeve and then joining the valve sleeve to the pole core.

The high-pressure-tight connection according to the invention between the pole core and the valve sleeve is produced without expensive laser welding, in one assembly station. By means of the connection according to the invention, the pole core is held in its position, withstanding the internal pressure that is introduced into the magnet valve during its operation as intended. Moreover, the connection according to the invention takes on the function of sealing off from the atmosphere.

It is especially advantageous that the outer die is separated from the middle die when the valve sleeve reaches the second reshaping edge, and after being separated from the outer die the middle die is switched to be forceless, and the outer die is moved onward in the previous working direction in order to join the valve sleeve further to the pole core. Because of the forceless middle die, the position of the pole core remains essentially unchanged, while the valve sleeve continues to be shaped to conform to the outer shape of the pole core.

In a feature of the method of the invention, the pole core is pressed more deeply into the valve sleeve past the outer die by further exertion of force, in order to make a desired stroke adjustment for an axially movable armature by means of the continuing reshaping operation of the valve sleeve. As a result, by the method of the invention, the stroke adjusting operation can be performed in the same assembly station as well, thus advantageously further simplifying the assembly process.

In a feature of the device of the invention, the pole core has a press-fit diameter, which widens the valve sleeve before reaching the first reshaping edge. The valve sleeve has an introduction chamfer, which facilitates introducing the valve sleeve into the joining gap. Furthermore, the press-fitting tool is embodied such that the outer die can be separated from the middle die during the connection operation. As a result, it is advantageously possible with the device of the invention also to perform the stroke adjustment of the armature guided movably in the valve sleeve.

Advantageous embodiments of the invention, described below, as well as the conventional exemplary embodiments described above for the sake of better comprehension of the these embodiments of the invention, are shown in the drawings. In the drawings, the same reference numerals identify components and elements that perform the same or analogous functions.

DESCRIPTION OF THE PREFERRED EMBODIMENT

Figure 1:
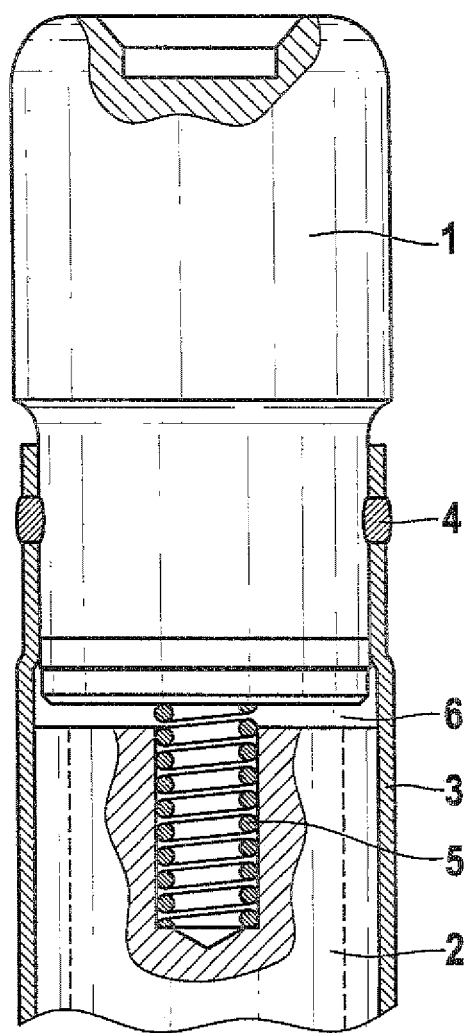
FIG. 1 shows a schematic sectional view of a conventional valve cartridge.

As can be seen from FIGS. 2 through 9, a device for producing a high-pressure-tight connection between a pole core 11 and a valve sleeve 13 of a magnet valve has, as a component essential to the invention, a two-part press-fitting tool 20, which includes a middle die 21 and an outer die 22; the press-fitting tool 20 is embodied such that between an inner bore 22.1 of the outer die 22 and the pole core 11 inserted into the press-fitting tool 20, a joining gap 25 is embodied, which is traversed by the valve sleeve 13 in the course of the assembly. As can also be seen from FIGS. 2 through 9, the inner bore 22.1 of the outer die 22 has a first reshaping edge 23 and a second reshaping edge 24, between which the diameter of the inner bore 22.1 narrows. Furthermore, the pole core 11 has a press-fit diameter 11.1, by means of which the valve sleeve 13 is widened during the assembly operation.

Figure 2:
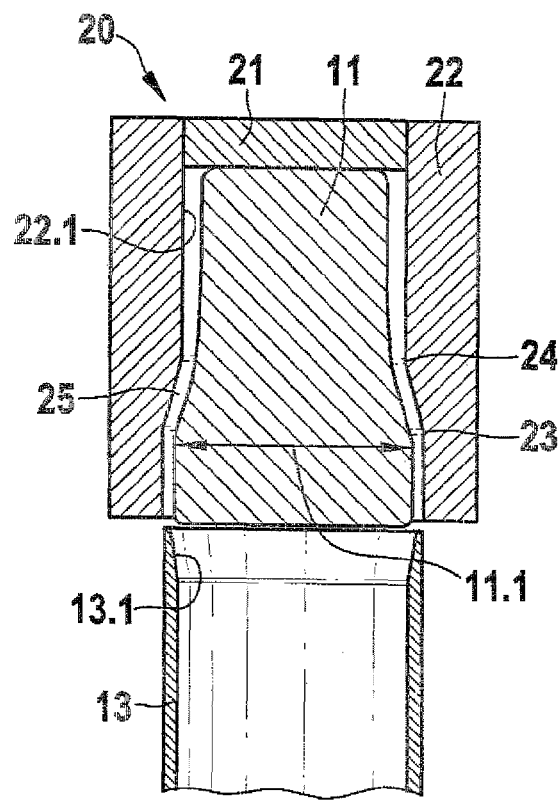
FIGS. 2 through 9 show various states during the method according to the invention for producing a high-pressure-tight connection between a pole core and a valve sleeve of a magnet valve.

FIG. 2 shows the press-fitting tool 20 after a first method step, in which the pole core 11 is inserted into the two-part press-fitting tool 20. The pole core 11 is inserted into the press-fitting tool 20 in such a way that the joining gap 25 is created between the inner bore 22.1 of the outer die 22 and the inserted pole core 11. Furthermore in FIG. 2, the pole core 11 is placed against the valve sleeve 13, and the valve sleeve 13 has an introduction chamfer 13.1, by way of which the valve sleeve 13 can be more easily introduced into the joining gap 25.

Figure 3:
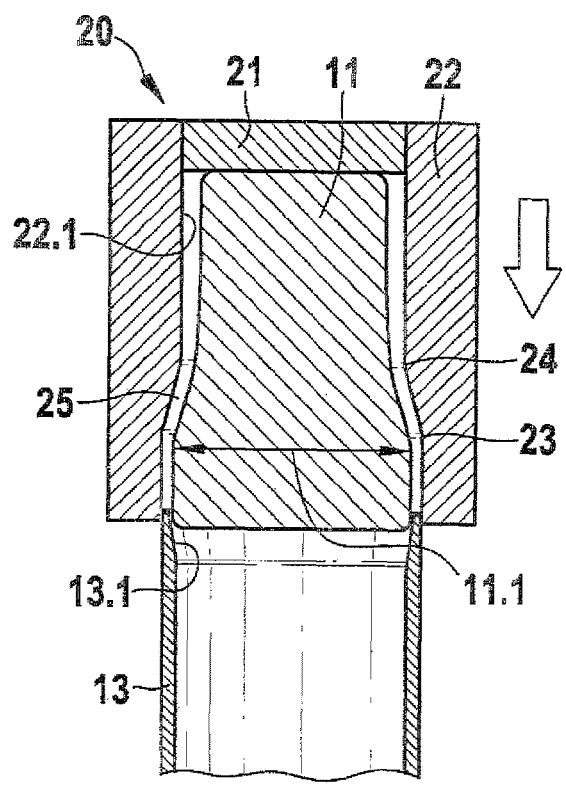
Figure 4:
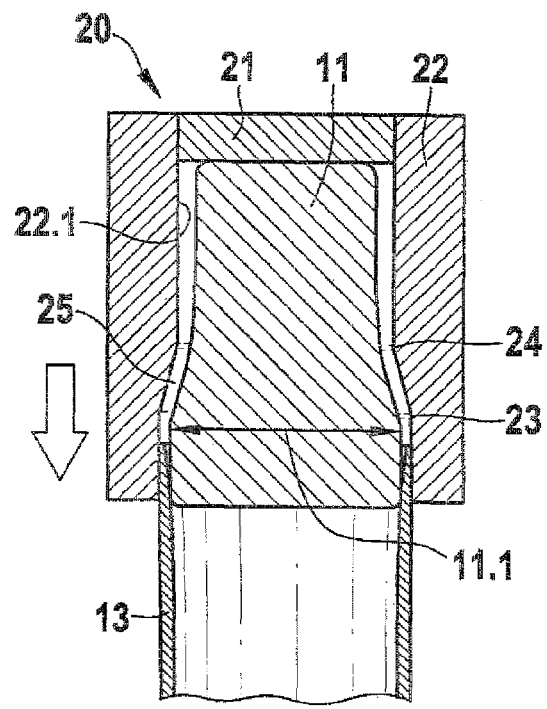

FIGS. 3 and 4 show the press-fitting tool 20 after the introduction of the valve sleeve 13 into the joining gap 25; the valve sleeve 13 is introduced into the joining gap 25 by simultaneous pressing down of the middle die 21 and the outer die 22 along with the pole core 11 in the direction of the arrow and passes through this gap.

Figure 5:
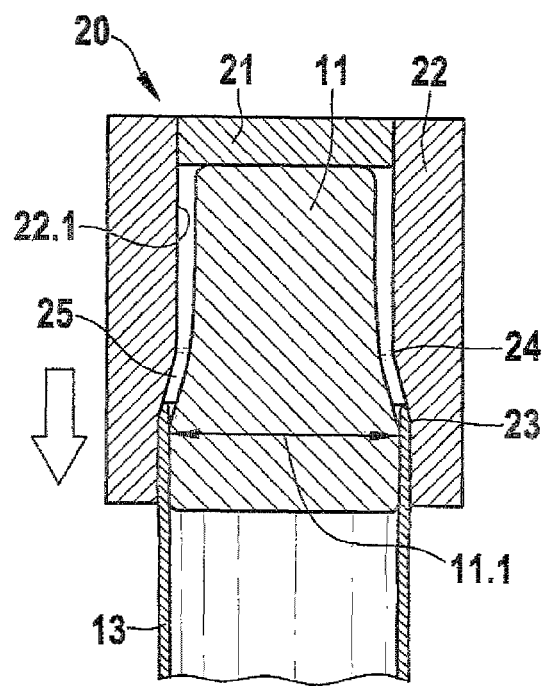

FIG. 5 shows the press-fitting tool 20 after the press-fit diameter 11.1 of the pole core 11 is reached, and the valve sleeve 13 overcomes the press-fit diameter 11.1 by means of widening. Once the first reshaping edge 23 is reached, the actual reshaping process of the valve sleeve 13 begins.

Figure 6:
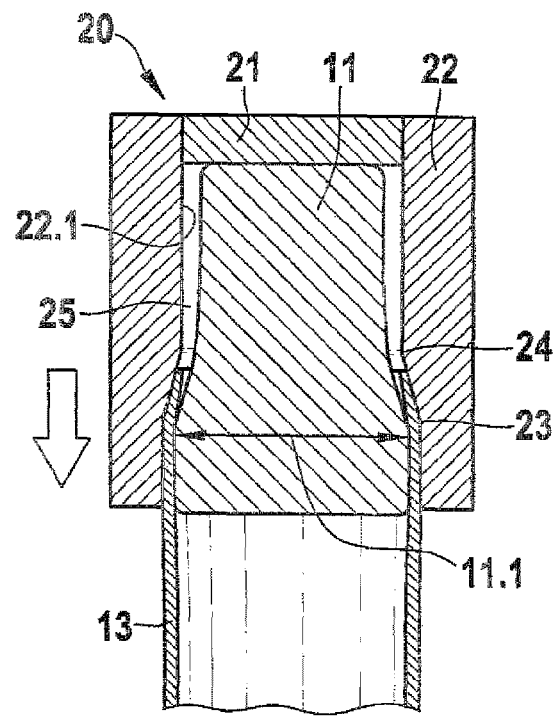
Figure 7:
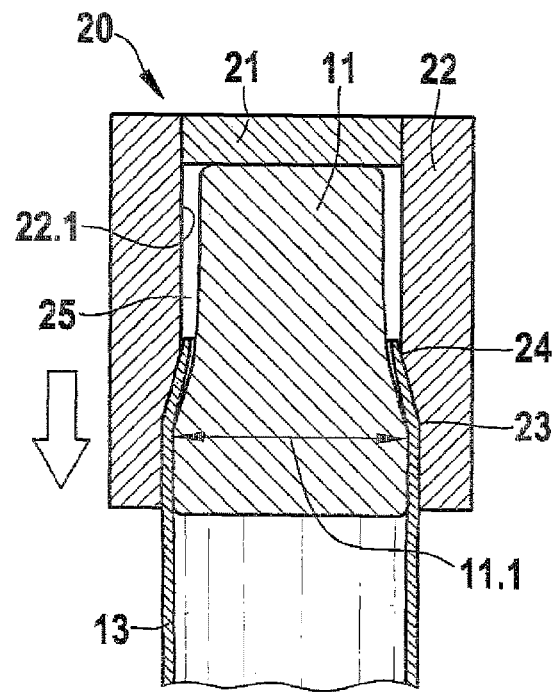

As can be seen from FIGS. 6 and 7, the valve sleeve 13 is reshaped in the joining gap 25 between the first reshaping edge 23 and the second reshaping edge 24 and is joined to the pole core 11.

Figure 8:
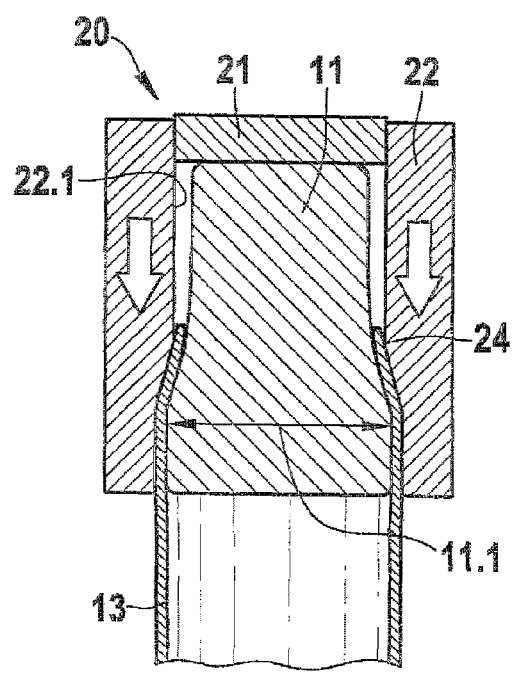

As can be seen from FIG. 8, the outer die 22 is separated from the middle die 21 when the valve sleeve 13 reaches the second reshaping edge 24. After the separation from the outer die 22, the middle die 21 is switched to be forceless, and the outer die 22 takes on the further work of joining the valve sleeve 13 to the pole core 11 by being moved onward in the previous working direction, indicated by arrows, in order to further join the valve sleeve 13 to the pole core 11. During this operation, the position of the pole core 11 remains essentially unchanged.

Figure 9:
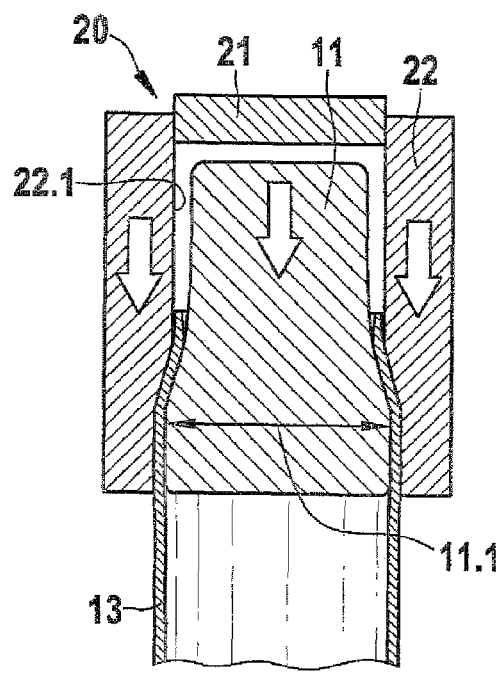

For adjusting a desired armature stroke, the pole core 11 can be pressed more deeply in the direction of the arrow into the valve sleeve 13, as seen in FIG. 9, by means of a further introduction of force by the outer die 22, which is moved in the direction of the arrow. The force introduced by the outer die 22 acts via the valve sleeve 13 on the pole core 11, which via a simultaneous, further reshaping operation of the valve sleeve 13 is pressed farther into the valve sleeve 13, so that by that means the adjustment of the armature stroke can be effected.

By means of the method and device according to the invention, without expensive laser welding, a valve cartridge for a magnet valve can be produced whose pole core and valve sleeve are connected to one another in high-pressure-proof fashion. Furthermore, the invention advantageously makes it possible to press-fit the pole core in, to adjust the armature stroke, and to provide sealing from the outside in a single operation in one assembly station. The invention thus takes on the stroke adjusting process, the retention function of the pole core relative to the operationally dictated internal pressure, and the sealing and retention function that in a conventional magnet valve have been performed by a laser welded seam between the pole core and the valve sleeve.

The foregoing relates to the preferred exemplary embodiment of the invention, it being understood that other variants and embodiments thereof are possible within the spirit and scope of the invention, the latter being defined by the appended claims.

The invention claimed is:

1. A valve cartridge for a magnet valve comprising:
   a pole core and a valve sleeve,
   wherein the pole core includes i) a first portion having a first outer diameter that corresponds to a press-fit outer diameter, ii) a second portion having a second outer diameter that is less than the first outer diameter, and iii) a joining portion interposed between the first portion and the second portion and having an outer diameter that narrows from the first portion to the second portion,
   wherein the first portion of the pole core is press-fitted into the valve sleeve through an opening in an end portion of the valve sleeve and the second portion projects out of the valve sleeve from the opening,
   wherein the joining portion is introduced into the valve sleeve along with the first portion,
   wherein the valve sleeve is joined to the joining portion of the pole core,
   wherein the pole core and the valve sleeve are connected to one another in high-pressure-proof fashion by a method comprising the following steps:
   inserting the pole core in a two-part press-fitting tool; which tool includes a middle die and an outer die, so that a joining gap is created between an inner bore of the outer die and the pole core inserted therein,
   placing the pole core against the valve sleeve and introducing the valve sleeve into the joining gap,
   simultaneously pressing down the middle die and the outer die with the pole core, so that the valve sleeve passes through the joining gap in a working direction,
   wherein the valve sleeve on reaching the press-fit diameter of the first portion of the pole core is widened and reshaped in the joining gap between a first reshaping edge and a second reshaping edge and joined to the joining portion of the pole core, and wherein a diameter of the inner bore narrows between the first reshaping edge and the second reshaping edge.

2. The valve as defined by claim 1, wherein the separating the outer die from the middle die when the valve sleeve reaches the second reshaping edge, and after separation from the outer die, the middle die switches to be forceless, and the outer die is moved onward in the working direction in order to join the valve sleeve further to the pole core.

3. The valve as defined by claim 2, wherein the method further comprises the step of pressing the pole core more deeply into the valve sleeve past the outer die by further exertion of force, in order to make a desired stroke adjustment for an axially movable armature by means of a continuing reshaping operation of the valve sleeve.

4. The valve as defined by claim 1, wherein the joining portion has a tapered outer diameter that tapers downwardly from the first outer diameter toward the second outer diameter.

5. The valve as defined by claim 1, wherein the valve sleeve defines a passage having an inner diameter that is widened by the first portion of the pole core when the first portion of the pole core is press-fitted into the passage.

6. The valve as defined by claim 5, wherein the valve sleeve is joined to the pole core by constricting the end portion of the valve sleeve around the joining portion of the pole core such that the inner diameter of the end portion of the valve sleeve narrows toward the opening.

7. The valve as defined by claim 1, wherein the end portion of the valve sleeve has an introduction chamfer.

* * * * *